United States Patent
Katagiri et al.

(10) Patent No.: US 8,275,259 B2
(45) Date of Patent: Sep. 25, 2012

(54) METHOD FOR DETERMINING VALUE OF CHROMATIC DISPERSION COMPENSATION

(75) Inventors: Toru Katagiri, Kawasaki (JP);
Tomohiro Hashiguchi, Kawasaki (JP);
Yutaka Takita, Kawasaki (JP);
Kazuyuki Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 553 days.

(21) Appl. No.: 12/578,751

(22) Filed: Oct. 14, 2009

(65) Prior Publication Data

US 2010/0098434 A1 Apr. 22, 2010

(30) Foreign Application Priority Data

Oct. 17, 2008 (JP) ................................. 2008-268191

(51) Int. Cl.
*H04B 10/08* (2006.01)

(52) U.S. Cl. ................ 398/29; 398/25; 398/28; 398/81; 398/147; 398/158

(58) Field of Classification Search .............. 398/25–29, 398/81, 147, 158, 159

See application file for complete search history.

(56) References Cited

U.S. PATENT DOCUMENTS

| 6,782,159 | B2 * | 8/2004 | Ng ................................... 385/24 |
| 2005/0244164 | A1 * | 11/2005 | Miyashita et al. ............ 398/147 |
| 2006/0193638 | A1 | 8/2006 | Akiyama et al. |
| 2009/0220241 | A1 * | 9/2009 | Katagiri et al. ................. 398/81 |

FOREIGN PATENT DOCUMENTS

WO 2005/006604 A1 1/2005

\* cited by examiner

*Primary Examiner* — Li Liu

(74) *Attorney, Agent, or Firm* — Staas & Halsey LLP

(57) ABSTRACT

A method for determining a value of chromatic dispersion compensation in an optical network including a plurality of nodes connected by at least one transmission line, the plurality of nodes including a plurality of dispersion compensators, the optical network including a plurality of wavelength paths between the optional nodes, the method includes determining a compensation value of the dispersion compensators in the optical network by the computer, the compensation value selecting that an error between the object value of the residual chromatic dispersion in accordance with of the first end node of the first path and the permissible value of the residual chromatic dispersion of the first end node of the first path is least, and the value of the residual chromatic dispersion of the first end is in the permissible value of the residual chromatic dispersion of the second end node of the second path.

16 Claims, 16 Drawing Sheets

FIG. 6

DCM TABLE

| DISPERSION COMPENSATION VALUE [ps/nm] | LOSS [dB] |
|---|---|
| −50 | 1.3 |
| −100 | 1.5 |
| −150 | 1.8 ← ≥ LOSdcm_lower = (1.7 dB) |
| −200 | 2.0 |
| ·· | ·· |
| −850 | 5.3 |
| −900 | 5.5 ← ≤ LOSdcm_upper = (5.7 dB) |
| −950 | 5.8 |
| ·· | ·· |

DCM CANDIDATE: −150 to −900

WP1 (i = 1)

SP1 [-450, -400, -350]  SP2 [-200, -150]  SP3 [-1000, -900, -800]

A → B → C → D

DCM CANDIDATE

| SPAN NO. s | DCM CANDIDATE NO. c | Ddcm [c] | VARdcm [c] |
|---|---|---|---|
| 1 | 1 | -450 | 0 |
| 1 | 2 | -400 | 1 |
| 1 | 3 | -350 | 0 |
| 2 | 4 | -200 | 1 |
| 2 | 5 | -150 | 0 |
| 3 | 6 | -1000 | 0 |
| 3 | 7 | -900 | 0 |
| 3 | 8 | -800 | 1 |

METHOD FOR DETERMINING VALUE OF CHROMATIC DISPERSION COMPENSATION

CROSS-REFERENCE TO RELATED APPLICATION

This application is based upon and claims the benefit of priority of the prior Japanese Patent Application No. 2008-268191, filed on Oct. 17, 2008, the entire contents of which are incorporated herein by reference.

FIELD

The embodiments discussed herein are related to a chromatic dispersion compensation design method for optical network.

BACKGROUND

The quality of an optical signal transmitted via an optical fiber depends upon chromatic dispersion. Accordingly, in long-distance optical fiber transmission, in order to suppress degradation of the waveform of an optical signal due to chromatic dispersion, one or more chromatic dispersion compensators are provided on a transmission path. In this case, each chromatic dispersion compensator is adjusted such that the residual chromatic dispersion is within a dispersion tolerance range at the reception terminal for each path (which will be referred to as "wavelength path" hereafter) via which an optical signal having a corresponding wavelength is to be transmitted. Accordingly, in order to improve the transmission quality of optical signal transmission, it is important to design the dispersion compensation values for the chromatic dispersion compensators.

As a chromatic dispersion compensation design method for an optical network, a method has been proposed in which the compensation values are determined according to a dispersion compensation map. With such a method, in general, the dispersion compensation map is provided for a path between two given points. By setting the dispersion compensation values for the chromatic dispersion compensators in the network according to the dispersion compensation map, such an arrangement is capable of suppressing degradation of the waveform due to chromatic dispersion that occurs in the transmission path via which an optical signal is to be transmitted between the two given points. However, this method has a problem of errors, i.e., the difference between the design value of the chromatic dispersion estimated for an optical fiber used for an optical transmission path and the actual chromatic dispersion, and a problem of errors due to the use of discrete compensation values provided by the chromatic dispersion compensators. The cumulative value of such errors depends upon the wavelength. Furthermore, in recent years, the optical add/drop node (OADM: Optical Add/Drop Multiplexer) and the wavelength cross connect node have been introduced. In such an arrangement, even if the compensation values for the chromatic dispersion compensators are set according to the dispersion compensation map for two given points in the network, in some cases, the optimum chromatic dispersion compensation values are not set for another wavelength path defined between a different pair of given points included entire path between the aforementioned two points or the part of it. This leads to difficulty in providing chromatic dispersion compensation which satisfies a desired dispersion map for all the wavelengths used in the optical network.

FIG. 16 is a diagram for describing a design method for chromatic dispersion compensation according to conventional techniques. An optical network illustrated in FIG. 16 includes optical add/drop nodes A, D, G, and J. Optical repeater nodes B and C are provided between the optical add/drop nodes A and D. Optical repeater nodes E and F are provided between the optical add/drop nodes D and G. Optical repeater nodes H and I are provided between the optical add/drop nodes G and J. Furthermore, each of the nodes A through J includes its own chromatic dispersion compensator.

In the aforementioned optical network, before operation is initiated, a wavelength path 1 is set between the optical add/drop nodes A and J, and a wavelength path 2 is set between the optical add/drop nodes D and G. In this case, the compensation value for the chromatic dispersion compensator provided to each optical node is set to an optimum value for the wavelength paths 1 and 2. Accordingly, the optical signal transmitted via the wavelength path 1 is protected from the effects of chromatic dispersion that occurs in the transmission path from the optical add/drop node A to the optical add/drop node J. The same can be said of the wavelength path 2.

A related technique is described in International Publication Pamphlet No. WO 2005/006604. That is to say, in a chromatic dispersion compensation design method described in International Publication Pamphlet No. WO 2005/006604, the compensation values for the chromatic dispersion compensators provided to each path are determined such that the residual dispersion range at each node due to the paths that arrive at the node is within a permissible residual dispersion range set for each path. Such a method provides a common and formulated optimized chromatic dispersion compensation for a point-to-point transmission system or a ring-structure system.

In the design method illustrated in FIG. 16, the chromatic dispersion compensation design is made only for the wavelength paths 1 and 2. In other words, the design is made without giving consideration to chromatic dispersion in the other paths. Specifically, such an arrangement does not perform chromatic dispersion compensation design for the path between the optical add/drop node A and the optical add/drop node D (which will be referred to as the "path A to D" hereafter), the path A to G, the path D to J, and the path G to J. Accordingly, in a case in which an additional new path is set in such paths, in some cases, the transmission properties of such an additional new wavelength path do not satisfy the permissible level. In the example illustrated in FIG. 16, the transmission properties of the path D to J and the path G to J are lower than the threshold level.

It should be noted that, in order to set such an additional new wavelength path having transmission properties that satisfy the permissible level, there is a need to recalculate the compensation value for the chromatic dispersion compensator included in each optical node. However, such recalculation must be made not only giving consideration to the transmission properties of the additional new wavelength path, but also giving consideration to the transmission properties of the wavelength paths 1 and 2 set previously. This leads to complicated recalculation of the compensation values for the chromatic dispersion compensators.

As one countermeasure against such a problem, a method can be conceived in which the chromatic dispersion compensation is designed beforehand such that the transmission properties satisfy the permissible level for all the paths. However, it is difficult to design an optical network having a complicated topology such that the transmission properties satisfy a uniform permissible level for all the paths. Furthermore, a configuration including optical fibers having high chromatic dispersion properties or chromatic dispersion compensators having high performance leads to an increase in the cost of constructing the network.

It is an object of the present invention to provide a method for designing compensation values for multiple chromatic dispersion compensators provided in an optical network such that the transmission qualities of existing optical paths and additional new optical paths satisfy a predetermined level.

SUMMARY

According to an aspect of the invention, a method for determining a value of chromatic dispersion compensation in an optical network including a plurality of nodes connected with at least one transmission line, the plurality of nodes including a plurality of dispersion compensators, the optical network including a plurality of wavelength paths between the optional nodes, the method includes preparing a computer; inputting information of an architecture of the optical network to the computer; inputting a first priority in accordance with a first wavelength path of the optional nodes and a second priority in accordance with a second wavelength path of the optional nodes to the computer, the second priority being lower than the first priority; setting an object value of a residual chromatic dispersion of a first end node of the first path in accordance with the information; setting a permissible value of a residual chromatic dispersion of a second end node of the second path in accordance with the information; and determining a compensation value of the dispersion compensators in the optical network by the computer, the compensation value selecting that an error between the object value of the residual chromatic dispersion in accordance with of the first end node of the first path and the permissible value of the residual chromatic dispersion of the first end node of the first path is least, and the value of the residual chromatic dispersion of the first end is in the permissible value of the residual chromatic dispersion of the first end node of the second path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram which illustrates the correspondence relation between the compensation value set for a compensation dispersion compensator and the loss thereof.

DESCRIPTION OF EMBODIMENTS

Figure 1:
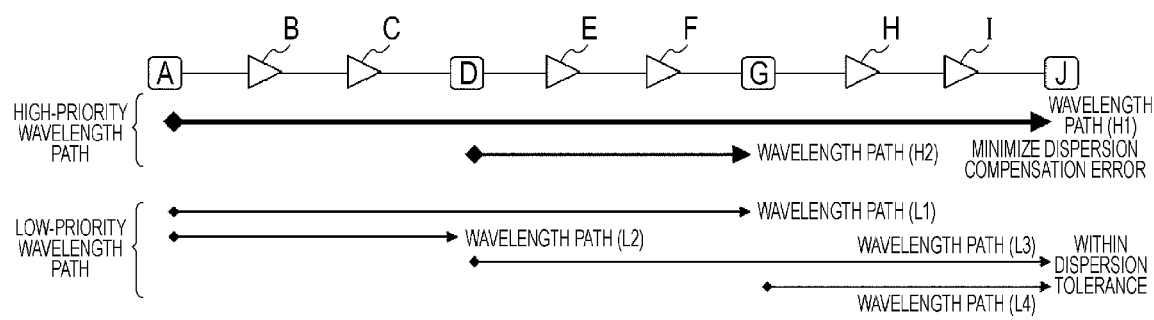
FIG. 1 is a diagram for describing, in outline, a chromatic dispersion compensation design method according to an embodiment.

FIG. 1 is a diagram for describing, in outline, a chromatic dispersion compensation design method according to an embodiment. An optical network illustrated in FIG. 1 includes optical add/drop nodes A, D, G, and J. Each optical add/drop node includes an optical add/drop multiplexer (OADM), and provides a function for dropping optical signals in increments of wavelengths and a function for adding optical signals in increments of wavelengths. Optical repeater nodes B and C are provided between the optical add/drop nodes A and D. Optical repeater nodes E and F are provided between the optical add/drop nodes D and G. Optical repeater nodes H and I are provided between the optical add/drop nodes G and J. Each of the optical repeater nodes B, C, E, F, H, and I include an optical amplifier which amplifies an optical signal. It should be noted that each of the optical add/drop nodes A, D, G, and J may also include an optical amplifier. Furthermore, in the present embodiment, each of the nodes A through J includes a chromatic dispersion compensator. It should be noted that all the nodes do not necessarily require their own chromatic dispersion compensators.

With the design method according to the embodiment, a priority level is assigned to each wavelength path (or section). A "wavelength path" is a path via which an optical signal is transmitted between a start terminal node and an end terminal in an optical network. In the optical network illustrated in FIG. 1, a wavelength path can be set between a desired pair of the optical add/drop nodes. In the example illustrated in FIG. 1, a wavelength path H1 is defined as a path between the optical add/drop nodes A and J. Furthermore, a wavelength path H2 is defined as a path between the optical add/drop nodes D and G. A high priority level is assigned to each of the wavelength paths H1 and H2. Furthermore, in other sections, wavelength paths L1 through L4 are defined with a low priority level. That is to say, the wavelength path L1 is defined as a path between the optical add/drop nodes A and G. The wavelength path L2 is defined as a path between the optical add/drop nodes A and D. The wavelength path L3 is defined as a path between the optical add/drop nodes D and J. The wavelength path L4 is defined as a path between the optical add/drop nodes G and J. Here, each of the wavelength paths L1 through L4 is assumed to include wavelength paths which can be virtually set for a section via which an optical signal is not transmitted.

The priority level of each wavelength path is specified by the user or the system designer, for example. For example, before operation of the optical network is initiated, a wavelength path is set with a high priority level for each section via which an optical signal is to be transmitted in actuality. Moreover, a wavelength path is set with a low priority level for each section which is a candidate path via which an optical signal could be transmitted in the future. Alternatively, a wavelength path may be set for all the sections having no high-priority wavelength path. In this case, in a case in which a high-priority wavelength path includes multiple sub-node sections, a wavelength path may be set with a low priority level for each of the sub-node sections. For example, in a case in which a high-priority wavelength path is set for the section A to G in FIG. 1, a section A to D and a section D to G are included in the section A to G. In this case, a low-priority wavelength path is automatically set for the section A to D. Here, it is assumed that a high-priority wavelength path is set for the section D to G as wavelength path (H2).

Also, the priority level of each wavelength path may be automatically determined according to predetermined conditions, for example. For example, an arrangement may be made in which, in a case in which the transmission bit rate of an optical signal to be transmitted via a wavelength path exceeds a predetermined threshold, a high priority level is assigned to such a wavelength path. With such an arrangement, a low priority level is assigned to each wavelength path which provides a transmission bit rate lower than the threshold value.

The compensation value for the chromatic dispersion compensator provided to each of the nodes A through J is determined so as to satisfy the following conditions.

High-priority wavelength path: A target value for the residual chromatic dispersion at the end terminal node is set for each high-priority wavelength path. The error, which is the difference between the residual chromatic dispersion value at the end node and the target value for the residual chromatic dispersion, is calculated. Next, the compensation value is determined for each chromatic dispersion compensator so as to minimize the sum of the errors in all the high-priority wavelength paths. In the example illustrated in FIG. 1, residual chromatic dispersion target values T1 and T2 are set for the wavelength paths H1 and H2, respectively. Furthermore, a residual chromatic dispersion value D1 at the node J is calculated for the wavelength path H1, and a residual chromatic dispersion value D2 at the node G is calculated for the wavelength path H2. Moreover, the error $\Delta 1$ (=D1-T1) is calculated for the wavelength path H1, and the error $\Delta 2$ (=D2-T2) is calculated for the wavelength path H2. In this case, as a condition for determining the compensation value for each chromatic dispersion compensator, the condition "the sum of the error $\Delta 1$ and the error $\Delta 2$ is minimized" is generated.

Low-priority wavelength path: A residual chromatic wavelength tolerance value at the end terminal node is set for each low-priority wavelength path. Such settings are defined under the constraint condition that the residual chromatic dispersion value at the end terminal node is to be within the residual chromatic dispersion tolerance range for each of the low-priority wavelength paths. In the example illustrated in FIG. 1, a chromatic dispersion tolerance value is set for each of the wavelength paths L1 through L4. Furthermore, the residual chromatic dispersion values are calculated at the node G of the wavelength path L1, at the node D of the wavelength path L2, at the node J of the wavelength path L3, and at the node J of the wavelength path L4. In this case, as a condition for determining the compensation value for each chromatic dispersion compensator, the condition "the residual chromatic dispersion value for each of the wavelength paths L1 through L4 is within a corresponding chromatic dispersion tolerance range" is generated.

As described above, with the design method according to the embodiment, the residual chromatic dispersion is optimized for each high-priority wavelength path. Thus, such an arrangement provides high transmission quality for each wavelength path via which optical signals are to be transmitted in actuality. Furthermore, such an arrangement satisfies a predetermined residual chromatic dispersion tolerance condition even for low-priority wavelength paths. Accordingly, such an arrangement is capable of setting an additional new wavelength path using such low-priority wavelength paths without large-scale degradation of the transmission quality of the additional new wavelength path.

Figure 2:
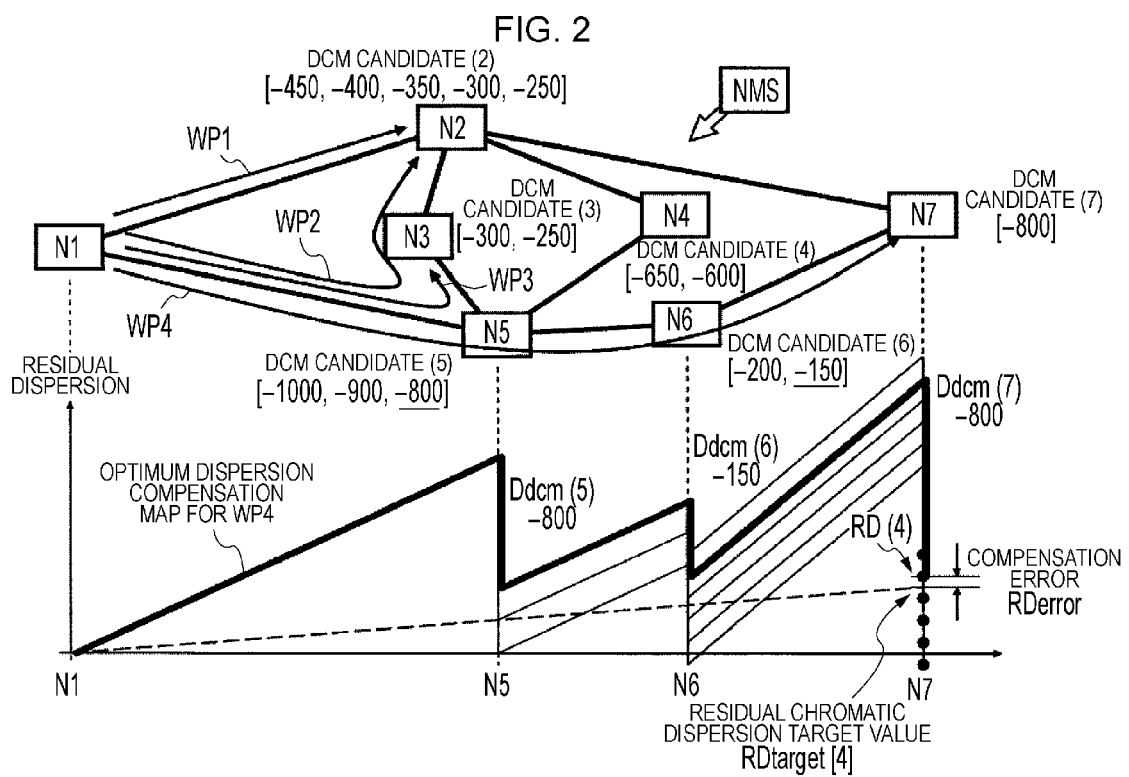
FIG. 2 illustrates an example of a configuration of an optical network and a dispersion map.

FIG. 2 is a diagram which illustrates an example of the configuration of an optical network and a dispersion map using the chromatic dispersion compensation design method according to the embodiment. The optical network includes nodes N1 through N7. Each of the nodes N1 through N7 includes a chromatic dispersion compensator module (DCM: Dispersion Compensation Module). With such an arrangement, the candidate compensation value is set for each of the chromatic dispersion compensators. For example, in FIG. 2, the candidate compensation values "-1000", "-900", and "-800" are set for the chromatic dispersion compensator provided to the node N5. Furthermore, the candidate compensation values "-200" and "-150" are set for the chromatic dispersion compensator provided to the node N6. Moreover, the candidate compensation value "-800" is set for the chromatic dispersion compensator provided to the node N7. It should be noted that the operations of the nodes N1 through N7 are centrally managed by a network managing system NMS, for example.

In the aforementioned optical network, wavelength paths WP1 through WP4 are set. Each of the wavelength paths WP1 through WP4 is a high-priority wavelength path. The chromatic dispersion map indicates the state of the chromatic dispersion with respect to the wavelength path WP4. In this example, "compensation value=-800 ps/nm" is selected at the node N5, "compensation value=-150 ps/nm" is selected at the node N6, and "compensation value=-800 ps/nm" is selected at the node N7. Such an arrangement provides the residual dispersion value RD(4). Furthermore, the target value "Rdtarget (4)", which is the target value for the residual chromatic dispersion at the node N7 which is the end terminal node, is set for the wavelength path WP4. Furthermore, the residual chromatic dispersion error "Rderror(4)" is obtained for the wavelength path WP4 according to the following Expression.

$$Rderror(4)=RD(4)-Rdtarget(4)$$

In the same way, residual chromatic dispersion errors RDerror(1) through RDerrror(3) are calculated for the wavelength paths WP1 through WP3, respectively. Furthermore, the compensation value for the chromatic dispersion compensator provided to each node is suitably selected so as to minimize the sum of the errors.

Figure 3:
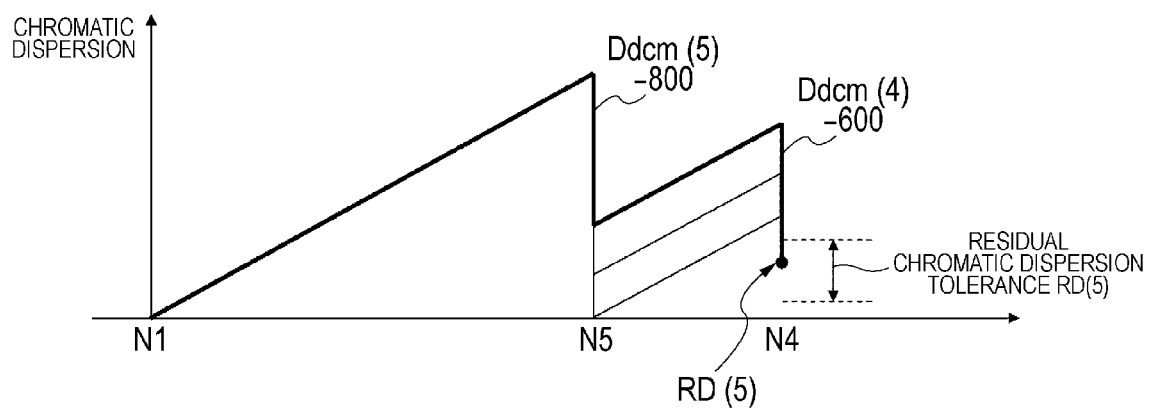
FIG. 3 illustrates an example of a dispersion map for a low-priority wavelength path.

In the aforementioned optical network, a low-priority wavelength path is set for each of sections where such a high-priority wavelength path has not been set. For example, a wavelength path WP5, which is a low-priority wavelength path, is set for the section that starts at the node N1, passes through the node N5, and arrives at the node N4. FIG. 3 illustrates an example of a chromatic dispersion map for the wavelength path WP5. In this example, "compensation value=-600 ps/nm" is selected at the node N4. It should be noted that, at the node N5, "compensation value=−800 ps/nm" is selected as described above. Such an arrangement provides a residual chromatic dispersion value "RD(5)". Furthermore, a residual chromatic dispersion tolerance "RDtolerance(5)" at the node N4, which is the end terminal node, is set for the wavelength path WP5. The residual chromatic dispersion tolerance is represented by the upper limit value and the lower limit value of the permissible residual chromatic dispersion. In the same way, the residual chromatic dispersion tolerance is set for each of the other low-priority wavelength paths. With such an arrangement, as will be described later in detail, the compensation value for the chromatic dispersion compensator provided to each node is suitably selected such that the residual chromatic dispersion value at the end terminal of each low-priority wavelength path is within the corresponding residual chromatic dispersion tolerance.

Figure 4:
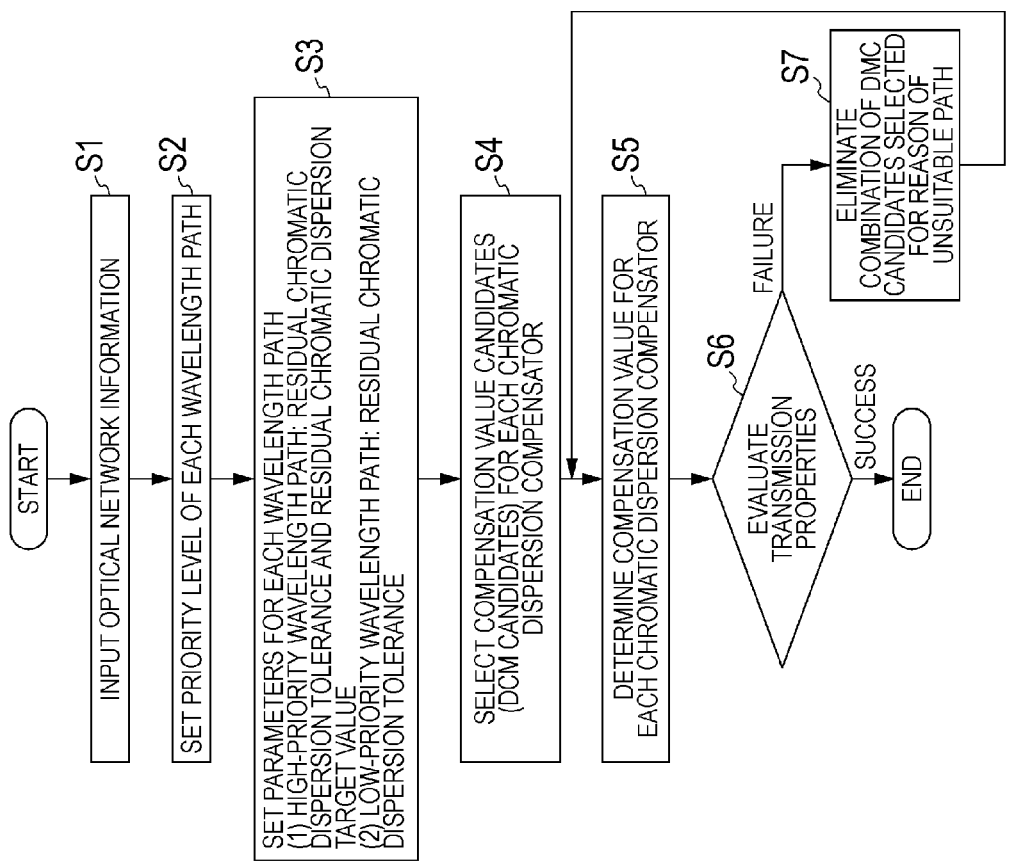
FIG. 4 is a flowchart which illustrates a chromatic dispersion compensation design method according to the embodiment.

FIG. 4 is a flowchart which illustrates a chromatic dispersion compensation design method according to the embodiment. The method illustrated in the flowchart is executed by a chromatic dispersion compensation design apparatus when an optical network is designed, for example. The chromatic dispersion compensation design apparatus is realized by executing the chromatic dispersion compensation design program.

In Step S1, optical network information is input. In Step S2, the priority level is set for each wavelength path. In Step S3, parameters used to design the chromatic dispersion compensation are set for each wavelength path. In Step S4, candidate compensation values are selected for each chromatic dispersion compensator. In Step S5, the compensation value is set for each chromatic dispersion compensator based upon the candidate compensation values obtained in Step S4. In this step, the compensation value is determined for each chromatic dispersion compensator by finding the solution of a predetermined objective function under a predetermined constraint condition. In Step S6, the transmission properties of the optical network which was designed in Step S5 are evaluated.

In a case in which the transmission properties are sufficient for all the wavelength paths, the chromatic dispersion compensation design ends. On the other hand, in a case in which it is detected that a wavelength path provides insufficient transmission quality, in Step S7, a constraint condition is created for eliminating a combination of the compensation values for the chromatic dispersion compensators arranged on the wavelength path thus detected, and the flow returns to Step S5. Subsequently, Steps S5 through S7 are repeatedly executed until the evaluation of the transmission properties made in Step S6 is successful. Detailed description will be made below regarding processing in each step.

[Step S1]

In Step S1, the optical network information necessary for designing the chromatic dispersion compensation is input. The optical network information is supplied by the optical network designer, for example, and is input to a computer which realizes the chromatic dispersion compensation design apparatus. The optical network information includes network topology information, node information, span information, and wavelength path information.

The network topology information includes information which specifies the layout of the nodes arranged on the optical network and the connection states of the nodes. The node information includes information which allows the type or function of a node (e.g., OADM node/optical amplification repeater node) to be identified. It should be noted that, in the optical network according to the embodiment, each node includes its own chromatic dispersion compensator. Also, only a part of the nodes may include their own chromatic dispersion compensators. In the later case, the node information includes information which specifies, in increments of nodes, whether or not the nodes include their own chromatic dispersion compensators.

The span information includes information with respect to the optical fibers used in each span (e.g., type of fiber, fiber length, chromatic dispersion value, transmission loss, etc.). It should be noted that, in the present specification, a transmission path that connects adjacent nodes will be referred to as a "span". The wavelength path information includes information with respect to paths via which each optical signal is to be transmitted in the optical network, transmission bit rate (e.g., 2.4 Gbps, 10 Gbps, 40 Gbps, 100 Gbps, etc.), wavelength information, and information with respect to the output power of the optical signal output from each node. It should be noted that, in a case in which a WDM signal is transmitted via a single wavelength path, parameters are set according to the standard wavelength of the WDM light. The standard wavelength is set to the center wavelength of the WDM signal wavelength band, for example.

It should be noted that the optical network information thus input in the chromatic dispersion compensation design method according to the embodiment is not restricted to the aforementioned information. Also, the optical network information may include other information with respect to the parameters used to compute the compensation values.

For example, the optical network information is input using a graphical user interface GUI or a character user interface. Alternatively, the optical network information may be input via batch processing from a file storing the optical network information and various kinds of parameters.

[Step S2]

In Step S2, the priority level is set for each of the wavelength paths defined in Step S1. In the present embodiment, the "high priority level" and the "low priority level" are selectively set. Alternatively, three or more priority levels may be selectively set. Also, the priority information may be specified for each wavelength path by the designer using a GUI or CUI. Also, the priority information may be read out from a file via batch processing. Alternatively, the priority level may be automatically set for each wavelength path based upon the optical network information input in Step S1. For example, an arrangement may be made in which the high priority level is assigned to the paths which provide transmission bit rates exceeding a threshold value (e.g., 10 Gbps), and the low priority level is assigned to the other wavelength paths which provide transmission bit rates which are equal to or smaller than the threshold value.

[Step S3]

In Step S3, the permissible residual chromatic dispersion range (chromatic dispersion tolerance) and the residual chromatic dispersion target value at an end terminal node are set for each high-priority wavelength path. Furthermore, the permissible residual chromatic dispersion range at an end terminal node is set for each low-priority wavelength path.

The permissible residual chromatic dispersion range is determined based upon the path information with respect to each wavelength path, the node information with respect to the nodes arranged on the path, the fiber information, the kind of signal to be transmitted via the wavelength path, the output power of the optical signal output from each node, etc. It should be noted that the permissible residual chromatic dispersion range is defined by the upper limit value and the lower limit value of the permissible residual chromatic dispersion. The residual chromatic dispersion target value is preferably set in a middle region of the permissible residual chromatic dispersion range. For example, the residual chromatic dispersion target value may be set to the center point of the permissible residual chromatic dispersion range, as represented by the following Expression (1).

[Expression 1]

$$RDtarget(i)=\{RDtolerance\_upper(i)+RDtolerance\_lower(i)\}/2 \qquad (1)$$

RDtarget(i) represents the residual chromatic dispersion target value for the wavelength path i. RDtolerance_upper(i) represents the upper limit value of the permissible residual chromatic dispersion range for the wavelength path i. Furthermore, RDtolerance_lower(i) represents the lower limit value of the permissible residual chromatic dispersion range for the wavelength path i. It should be noted that the determining method for the residual chromatic dispersion target value is not restricted to Expression (1). Also, the residual chromatic dispersion target value may be determined using other methods.

[Step S4]

In Step S4, the candidate dispersion compensation values (which will also be referred to as "DCM candidates" hereafter) for the chromatic dispersion compensator included in each node are selected based upon the optical network information input in Step S1 and the parameters set in Step S3. The DCM candidates are selected using the following first through third methods.

In the first method, it is assumed that the chromatic dispersion compensator is provided on the input side of an optical amplifier. Furthermore, it is assumed that a dispersion compensation fiber module, which is capable of switching the dispersion compensation value in a discrete manner, is employed as the chromatic dispersion compensator. In this case, the chromatic dispersion compensator insertion loss changes according to the compensation value set for the chromatic dispersion compensator. Accordingly, the DCM candidates for the chromatic dispersion compensators are set such that the power of the optical signal that passes through the chromatic dispersion compensator is within the input dynamic range of the optical amplifier after the optical signal is transmitted via the optical transmission path.

Figure 5:
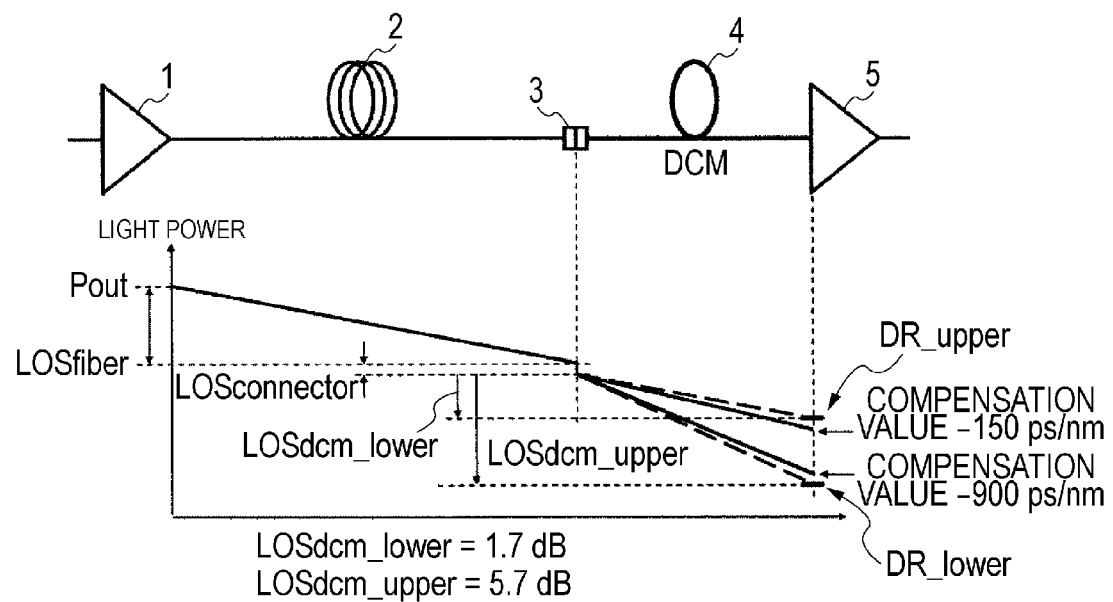
FIG. 5 is a diagram for describing an example of a design method for DCM candidates.

Specific description will be made regarding the first method with reference to FIG. 5. In FIG. 5, an optical signal transmitted from an optical amplifier 1 is transmitted via an optical transmission path 2. Furthermore, the optical signal thus transmitted passes through an optical connector 3, following which the optical signal is input to a chromatic dispersion compensator (DCM) 4. The chromatic dispersion compensator 4 is provided on the input side of an optical amplifier 5. Pout represents the output light power of the optical amplifier 1. LOSfiber represents the light loss for the optical transmission path 2. LOSconnector represents the light loss for the optical connector 3. DRupper and DRlower represent the upper limit value and the lower limit value of the input dynamic range of the optical amplifier 5, respectively. In this case, the range of the permissible insertion loss for the chromatic dispersion compensator 4 in the span illustrated in FIG. 5 is represented by the following Expression (2). It should be noted that LOSdcm_upper and LOSdcm_lower represent the upper limit value and the lower limit value of the insertion loss range for the chromatic dispersion compensator 4.

$$LOSdcm\_upper \leq Pout - (LOSfiber + LOSconnector) - DRlower$$

$$LOSdcm\_lower \geq Pout - (LOSfiber + LOSconnector) - DRupper \qquad (2)$$

In the example illustrated in FIG. 5, LOSdcm_upper is set to 5.7 dB, and LOSdcm_lower is set to 1.7 dB. Here, it is assumed that the correspondence relation illustrated in FIG. 6 is obtained beforehand. Furthermore, the chromatic dispersion compensator 4 can switch the compensation value in a discrete manner. In this case, the compensation value range is obtained based upon the permissible loss value. In the example illustrated in FIG. 6, the loss range is set to a range between 1.7 and 5.7 dB. Accordingly, a compensation range of −150 to −900 ps/nm is obtained as the candidate compensation value for the chromatic dispersion compensator 4. It should be noted that the correspondence relation illustrated in FIG. 6 is input in Step S1 as the optical network information, for example.

In the second method, the residual chromatic dispersion target value that corresponds to each wavelength path which passes through the span is estimated for each span where a chromatic dispersion compensator is arranged (in a case in which each node includes its own chromatic dispersion compensator, the estimation is made for all the spans), and the dispersion compensation values that match the range including all the residual chromatic dispersion target values thus estimated are selected as the DCM candidates that correspond to the span.

Figure 7:
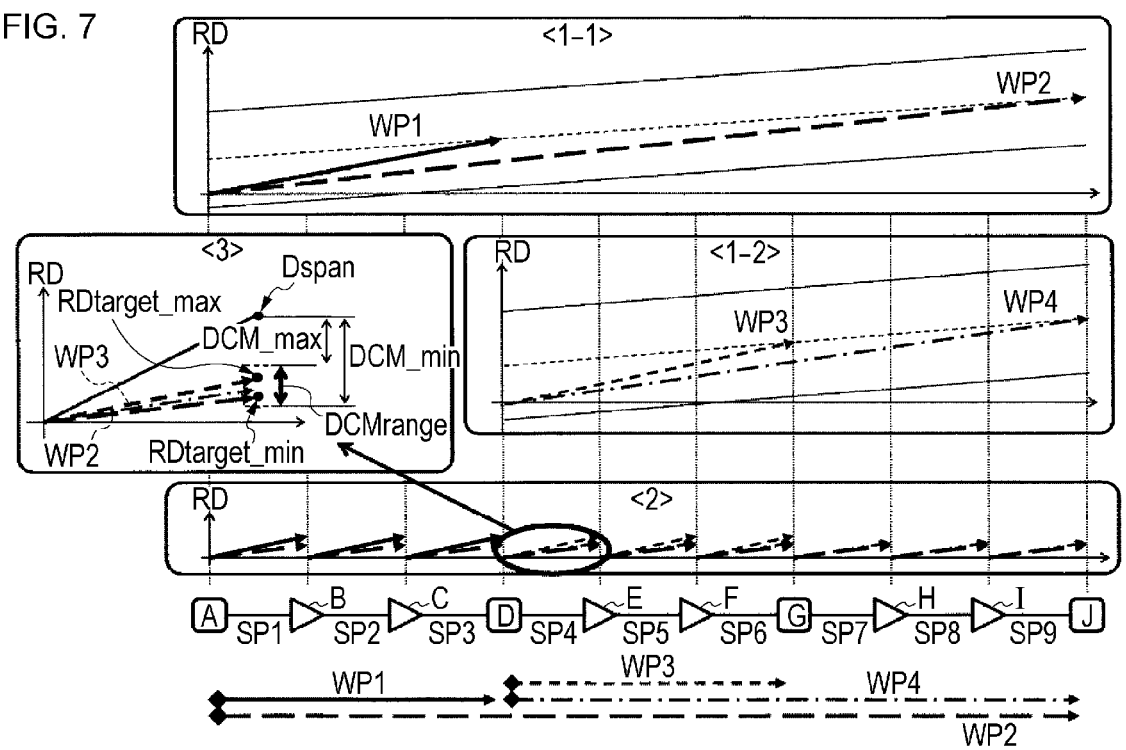
FIG. 7 is a diagram for describing another example of a design method for the DCM candidates.

FIG. 7 is a diagram for describing a procedure for setting the DCM candidates using the second method. Here, it is assumed that, in the optical network including the nodes A through J, the wavelength paths WP1 through WP4 are set.

As illustrated in <1-1> and <1-2> in FIG. 7, the slope of the residual chromatic dispersion is calculated for each of the wavelength paths WP1 through WP4 based upon the residual chromatic dispersion target value at the end terminal node thus set in Step S3. The slope RDtarget_slope of the residual chromatic dispersion for each wavelength path is calculated according to the following Expression (3). It should be noted that the L represents the length of the wavelength path. RDtarget represents the residual chromatic dispersion target value at the end terminal node of the wavelength path. i (=1, 2, 3, 4) identifies the wavelength path.

$$RDtarget\_slope[i]=RDtarget[i]/L[i] \qquad (3)$$

It should be noted that two parallel solid lines illustrated in each of <1-1> and <1-2> in FIG. 7 represent the upper limit value and the lower limit value of the permissible residual chromatic dispersion range. Furthermore, the dotted line represents the midpoint of the permissible residual chromatic dispersion range.

Next, as illustrated in <2> in FIG. 7, the residual chromatic dispersion target value (intermediate residual chromatic dispersion target value) at the reception-side node in the span is determined for all the wavelength paths WPi that pass through the span in increments of spans (SP1 through SP9) defined by adjacent nodes from among the nodes A through J. Specifically, the residual chromatic dispersion target value RDtarget[i,s] for the wavelength path WPi at the reception-side node in the span is represented by the following Expression (4).

$$RDtarget[i,s]=RDtarget\_slope[i] \cdot Lspan[s] \qquad (4)$$

RDtarget_slope[i] represents the slope of the residual chromatic dispersion for the wavelength path WPi, and is calculated according to the aforementioned Expression (3). Lspan[s] represents the length of the span s.

Subsequently, the DCM candidates that correspond to each span are set based upon the residual chromatic dispersion target values calculated in Expression (4). Specifically, in a case in which n wavelength paths pass through the span s, n residual chromatic dispersion target values are calculated for the span s. For example, in the example illustrated in FIG. 7, two residual chromatic dispersion target values are calculated for each of the spans SP1 through SP3 and SP7 through SP9. Three residual chromatic dispersion target values are calculated for each of the spans SP4 through SP6.

Description will be made regarding the span SP4 as an example. The wavelength paths WP2, WP3, and WP4 are set for the span SP4. As illustrated in <3> in FIG. 7, the residual chromatic dispersion target value that corresponds to the wavelength path WP3 is the maximum value. Moreover, the residual chromatic dispersion target value that corresponds to the wavelength path WP2 is the minimum value.

$$RDtarget\_max = RDtarget[3,4]$$

$$RDtarget\_min = RDtarget[2,4]$$

It should be noted that the point Dspan represents the wavelength dispersion value that occurs in the span SP4.

In this case, the chromatic dispersion compensation value range DCMrange[s] which includes all the residual chromatic dispersion target values RDtarget[i,s] in the span s is represented by the following Expression (5).

$$RDtarget\_min[i,s] - Dspan[s] \leq DCMrange[s] \leq RDtarget\_max[i,s] - Dspan[s] \quad (5)$$

In the second method, the compensation values for the chromatic dispersion compensator which satisfy the Expression (5) are selected as the DCM candidates for the span s. For example, in a case in which the chromatic dispersion compensator provided to the span SP1 is capable of switching the compensation value in a range between −50 ps/nm and −1000 ps/nm in increments of 50 ps/nm, and the range calculated based upon the Expression (5) is represented by the Expression −430 ps/nm≦DCMrange[1]≦−280 ps/nm, the compensation values −300 ps/nm, −350 ps/nm, and −400 ps/nm are selected as the DCM candidates.

It should be noted that the DCM candidates to be selected using the second method preferably satisfy the range calculated using the first method.

Figure 8:
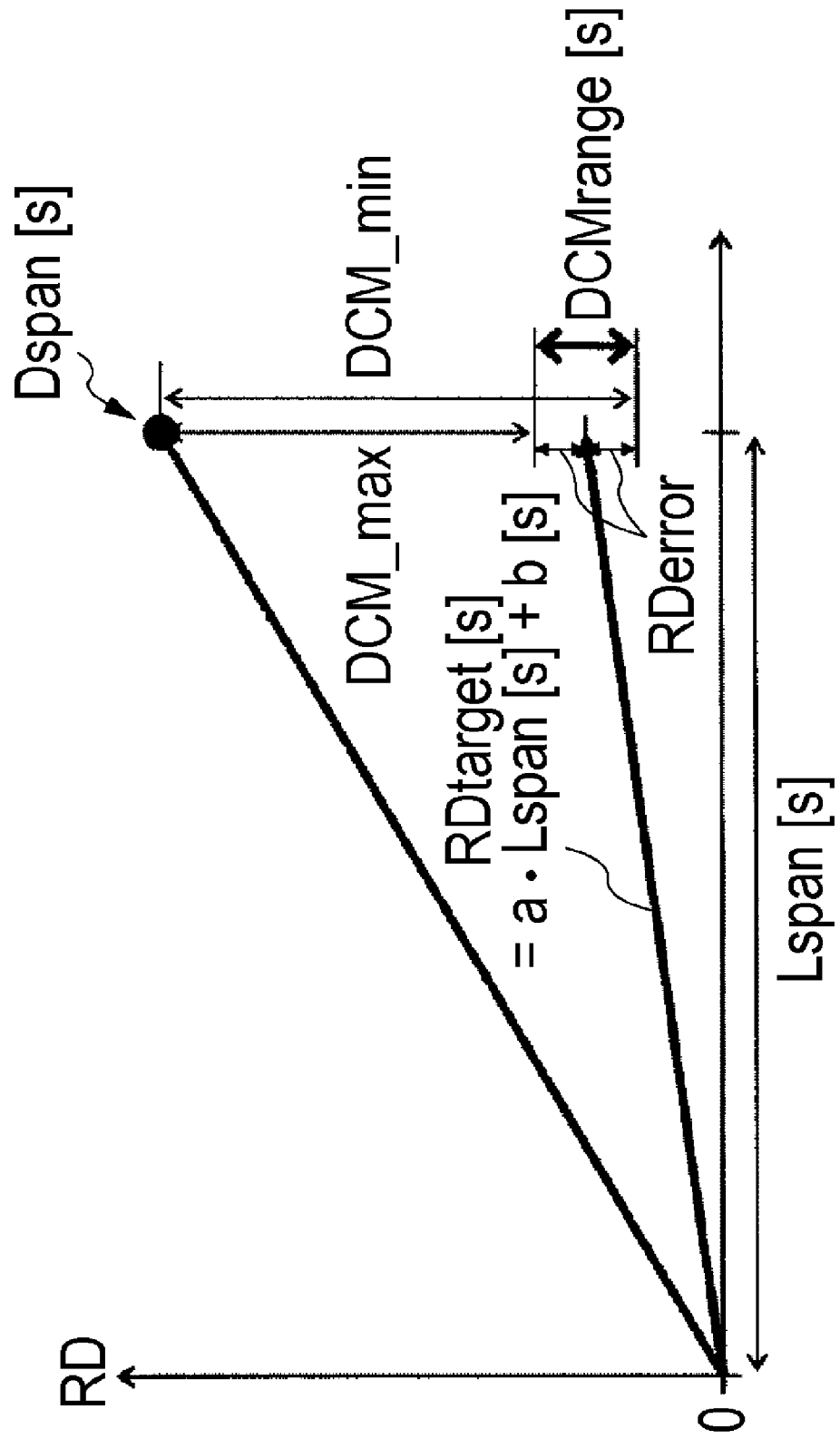
FIG. 8 is a diagram for describing yet another example of a design method for the DCM candidates.

The third method is a procedure obtained by simplifying the second method. As illustrated in FIG. 8, the third method is executed assuming that the residual chromatic dispersion target value for each span depends upon only the length of the corresponding span. That is to say, the residual chromatic dispersion target value RDtarget[s] for the span s is represented by the following Expression (6).

It should be noted that Lspan[s] represents the length of the span s.

$$RDtarget[s] = a \cdot Lspan[s] + b[s] \quad (6)$$

a is a constant which represents the slope of the residual chromatic dispersion target value for the span length. b[s] is a constant which represents the offset of the residual chromatic dispersion target value for the transmission-side node in the span s. It should be noted that, in FIG. 8, b is zero. In this case, the compensation value range is obtained by the Expression RDtarget[s]±ΔRD. ΔRD represents a predetermined permissible margin of error. The discrete values of the compensation values included within the compensation value range thus obtained are selected as the DCM candidates.

It should be noted that the DCM candidates selected using the second method also preferably satisfy the range calculated using the first method. Also, the method for determining the DCM candidates is not restricted to the above-described first through third methods.

[Step S5]

In Step S5, the compensation value to be set for each chromatic dispersion compensator included in the optical network is designed based upon various kinds of information thus set in Steps S1 through S4. Here, description will be made with reference to an example in which mixed integer programming, which is an application of linear programming, is applied to the chromatic dispersion compensation design method. That is to say, the objective function and the constraint conditions are set as follows, and the compensation value to be set for each chromatic dispersion compensator is determined so as to satisfy the following conditions.

Objective function: The objective function provides a function to minimize the sum total of the differences between the residual chromatic dispersion values at the end terminal nodes in the high-priority wavelength paths and the residual chromatic dispersion target values (i.e., the cumulative chromatic dispersion compensation error for each wavelength path).

Constraint condition 1: The compensation value which can be set for each chromatic dispersion compensator must be selected from among the DCM candidates obtained in Step S4.

Constraint condition 2: The cumulative chromatic dispersion value at the end terminal nodes of each low-priority wavelength path must be within the corresponding permissible residual chromatic dispersion range.

The objective function and the constraint conditions are represented by the following Expressions.

Objective function: [Expression 2]

$$\text{Minimize} \sum_{Gh_i} (negRDError[Gh_i] + posRDError[Gh_i])$$

Constraint conditions:

$$\begin{cases} \sum_c dcmInfo[s,c] \cdot dcmVar[c] = 1 \text{(for } \forall s) \\ term[Gh_i] - posRdError[Gh_i] + negRdError[Gh_i] = \\ \quad rdTarget[Gh_i] \text{(for } \forall Gh_i) \\ term[Gl_j] - upperTolerance[Gl_j] \leq 0 \text{(for } \forall Gl_j) \\ term[Gl_j] - lowerTolerance[Gl_j] \geq 0 \text{(for } \forall Gl_j) \end{cases}$$

Ghi identifies the high-priority wavelength path.

Glj identifies the low-priority wavelength path.

s identifies the span.

c identifies the DCM candidate (i.e., candidate correction value set for each chromatic dispersion compensator).

negRdError[Ghi] represents a compensation error which is defined when the condition "residual chromatic dispersion value−residual chromatic dispersion target value≦0" is satisfied (negRdError[Ghi] is a variable that always exhibits a positive value) for the high-priority wavelength path i.

posRdError[Ghi] represents a compensation error which is defined when the condition "residual chromatic dispersion value−residual chromatic dispersion target value≧0" is satisfied (negRdError[Ghi] is a variable that always exhibits a positive value) for the high-priority wavelength path i.

dcmInfo[s,c] represents a variable which is set to "1" in a case in which the DCM candidate c is a candidate for the span s. Otherwise, dcmInfo[s,c] is set to "0".

dcmVar[c] represents a variable which is set to "1" in a case in which the DCM candidate c is selected. Otherwise, dcmVar[c] is set to "0".

term[Ghi] represents the residual chromatic dispersion value at the end terminal node in the high-priority wavelength path i.

rdTarget[Ghi] represents the residual chromatic dispersion target value for the high-priority wavelength path i.

term[Glj] represents the residual chromatic dispersion value at the end terminal node in the low-priority wavelength path j.

upperTolerance[Glj] represents the upper limit value of the permissible residual chromatic dispersion for the low-priority wavelength path j.

lowerTolerance[Glj] represents the lower limit value of the permissible residual chromatic dispersion for the low-priority wavelength path j.

term[g] represents the residual chromatic dispersion value at the end terminal node in the wavelength path g (high-priority wavelength path i or low-priority wavelength path j).

The first constraint condition expression indicates that one candidate must be selected from among one or multiple DCM candidates c set for the span s. The second constraint condition expression indicates the compensation error in the chromatic dispersion compensation for the high-priority wavelength path i. The third and the fourth constraint condition expressions indicate that the residual chromatic dispersion value at the end terminal node in the low-priority wavelength path j must be within the permissible residual chromatic dispersion range. It should be noted that the residual chromatic dispersion value term[g] at the end terminal node in the wavelength path g (either high-priority wavelength path i or low-priority wavelength path j) is represented by the following Expression.

$$\text{term}[g] = \sum_s \text{fiberDipsersion}[s] \cdot \text{routeInfo}[g, s] + \quad \text{[Expression 3]}$$
$$\sum_s \sum_c \text{dcmDispersion}[c] \cdot \text{dcmVar}[c] \cdot \text{dcmInfo}[s, c]$$

fiberDispersion[s] represents the chromatic dispersion value that occurs in the span s.

route[g,s] represents a variable which is set to "1" in a case in which the wavelength path g (high-priority wavelength path i or low-priority wavelength path j) passes through the span s. Otherwise, route[g,s] is set to "0".

dcmDispersion[c] represents the wavelength dispersion value of the DCM candidate c.

As described above, by setting the objective function and the constraint conditions used in the linear programming (or mixed integer programming) using ordinary mathematical programming software, such an arrangement is capable of easily deriving the optimum solution for the compensation value to be set for the chromatic dispersion compensator included in each node. That is to say, one compensation value is selected for each chromatic dispersion compensator from among one or multiple candidate compensation values prepared for each chromatic dispersion compensator so as to satisfy the aforementioned constraint conditions. Thus, the compensation value is determined for each chromatic dispersion compensator.

[Step S6]

After the execution of the processing in Step S5, the residual wavelength dispersion at the end terminal node in each wavelength path satisfies the predetermined conditions. However, in a case in which the wavelength path passes through multiple nodes, the calculation in Step S5 does not necessarily guarantee the properties at intermediate nodes in the wavelength path. Accordingly, in Step S6, the transmission properties of each wavelength path are evaluated based upon the calculation results obtained in Step S5. For example, judgment is made whether or not the residual chromatic dispersion value that occurs in each intermediate transmission span is within a predetermined permissible range for all the wavelength paths set in the optical network (including the high-priority wavelength paths and low-priority wavelength paths). Also, other properties may be checked.

As a result, in a case in which the transmission properties satisfy predetermined requirements for all the wavelength paths, the processing ends. In this case, the result obtained in the compensation design in Step S5 is transmitted to each node as a notice via the network management system, for example. Upon reception of the notice, the chromatic dispersion compensator included in each node performs chromatic dispersion compensation using the compensation value thus received. On the other hand, in a case in which one or more wavelength paths do not satisfy desired properties, the flow proceeds to Step S7.

[Step S7]

With respect to a wavelength path for which the design calculation has been judged in Step S6 to be a failure (which will be referred to as an "incompatible wavelength path" hereafter), the compensation value to be set for each chromatic dispersion compensator arranged at the incompatible wavelength path is preferably changed. Accordingly, in Step S7, a constraint condition is generated for changing a combination of the compensation values for the chromatic dispersion compensators arranged on the incompatible wavelength path.

In Step S7, first, the compensation values for the chromatic dispersion compensators for a wavelength path g, which has been judged to be incompatible, is extracted. Subsequently, the selected compensation value (the chromatic dispersion compensation value c which satisfies the condition dcmVar[c]·dmcInfo[s,c]=1) selected in each span (span s which satisfies the condition routeInfo[g,s]=1) via which the wavelength path g passes through is extracted. Next, a constraint expression for eliminating a combination of the chromatic dispersion compensation values c thus selected for the spans is added to the constraint conditions illustrated in Step S5. The constraint expression generated in Step S7 is as follows.

$$\sum_{c \in currentSolution\ for\ g} \text{dcmVar}[c] \leq (\text{numOfDCM}[g] - 1) \quad \text{[Expression 4]}$$

g identifies the incompatible wavelength path.

c represents a combination of the compensation values that satisfy the condition dcmVar[c]·dmcInfo[s,c]=1 (i.e., a combination of the compensation values calculated for the chromatic dispersion compensators on the incompatible wavelength path).

numOfDCM[g] represents the number of chromatic dispersion compensators included in the wavelength path g.

After the addition of the aforementioned constraint expression, the processing in Step S5 is executed again. The subsequent procedure is the same as that described above. It should be noted that such an arrangement is capable of designing chromatic dispersion compensation with high precision by repeatedly executing Steps S5 through S7. Also, an upper limit may be applied to the number of times Steps S5 through S7 are repeatedly executed.

Figure 9:
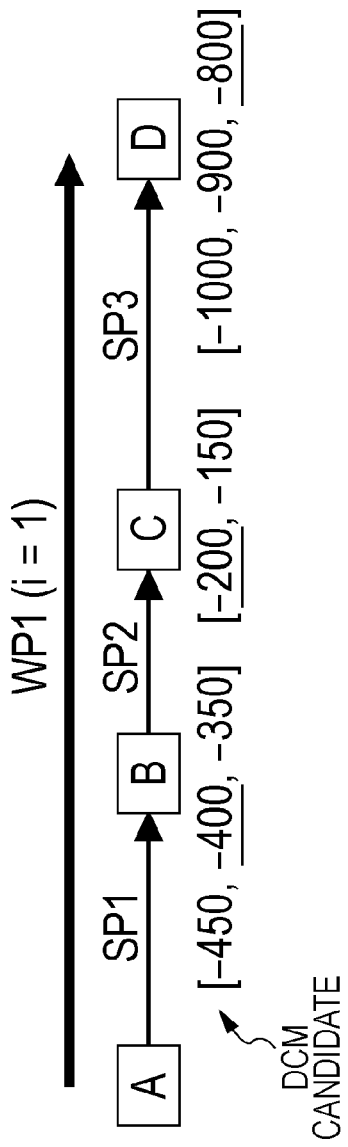
FIG. 9 illustrates an embodiment of processing for eliminating incompatible candidates.

Description will be made regarding a specific example. As illustrated in FIG. 9, in this example, description will be made assuming a wavelength path from a node A up to a node D via nodes B and C. Furthermore, it is assumed that three DCM candidates (−450, −400, −350) are set for a chromatic dispersion compensator included in the node B, two DCM candidates (−200, −150) are set for a chromatic dispersion compensator included in the node C, and three DCM candidates (−1000, −900, −800) are set for a chromatic dispersion compensator included in the node D. Furthermore, it is assumed that the compensation values "−400 ps/nm (s=1, c=2)", "−200 ps/nm (s=2, c=4)", and "−800 ps/nm (s=3, c=8)" are selected as the compensation values to be set for the chromatic dispersion compensators included in the nodes B, C, and D, respectively, by computation in Step S5.

In this case, the aforementioned constraint expression is represented as follows.

$$dcmVar(2)+dcmVar(4)+dcmVar(8) \leq \{Num0fDCM(g)-1\}$$

Here, Num0fDCM(g) represents the number of spans on the wavelength path, and is "3" in the example illustrated in FIG. 9. Accordingly, the aforementioned constraint expression signifies the elimination of the state in which "c=2" is selected for the node B, "c=4" is selected for the node C, and "c=8" is selected for the node D.

Thereafter the combination for which it was judged in Step S6 that the design calculation had failed is prevented from being selected as the optimum solution. Accordingly, by repeatedly executing Steps S5 through S7, such an arrangement acquires the optimum solution that satisfies the predetermined requirements for all the wavelength paths. That is to say, such an arrangement determines a suitable compensation value to be set for each chromatic dispersion compensator.

[Setting of Priority Level of Wavelength Path]

The priority level of the wavelength path may be input by the designer of the optical network via a CUI, GUI, or the like. Also, the priority level of the wavelength path may be automatically set based upon the optical network information or various kinds of parameters. Description will be made regarding a method for automatically setting the priority level of the wavelength path.

[(1) Method Based Upon Optical Network Information]

The designer can specify wavelength paths in the aforementioned optical network information. In this case, each of the wavelength paths thus specified is set as the "high-priority wavelength path". Furthermore, the other sections, which have not been set to the "high-priority wavelength path", are automatically set to the "low-priority wavelength path".

Figure 10:
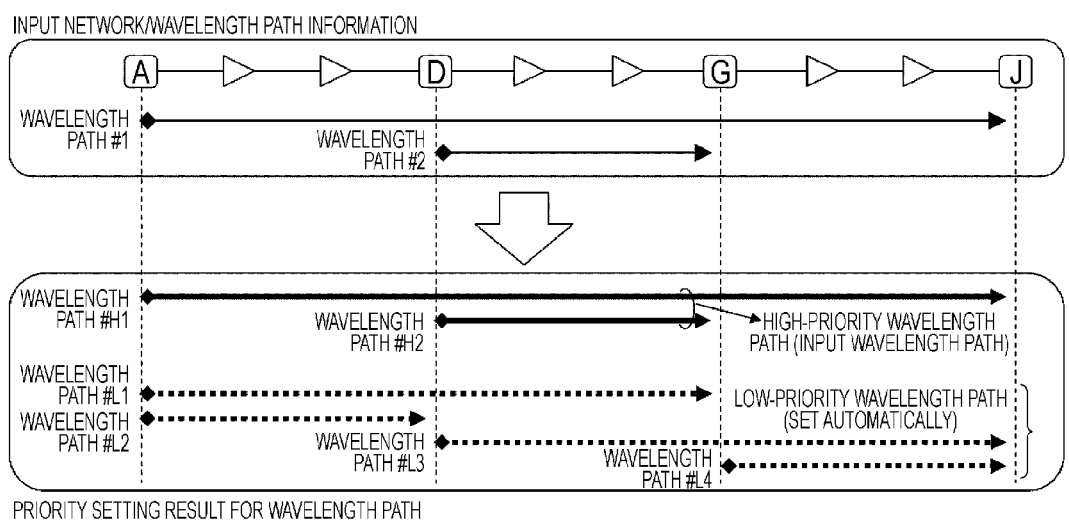
FIG. 10 illustrates an embodiment of a method for determining the priority level of each wavelength path.

Description will be made regarding an example with reference to FIG. 10. Here, the optical network includes four OADM nodes (A, D, G, J) connected to each other via optical fibers, and six optical amplifier nodes. Furthermore, it is assumed that, in the optical network information, a wavelength path is set for each of the section between the nodes A and J, the section between the nodes D and G.

In this case, these two wavelength paths are set as the high-priority wavelength paths (#H1, #H2). Subsequently, the node sections to which the wavelength path has not been assigned are extracted from the optical network. In this case, the term "node section" signifies the section between a pair of nodes. In this case, in the example illustrated in FIG. 10, the section A to G, the section A to D, the section D to J, and the section G to J, are extracted. With such an arrangement, the wavelength paths to be set for the four sections thus extracted are set to the low-priority wavelength paths (#L1 through #L4), respectively.

[(2) Method Based Upon Transmission Bit Rate Provided by Wavelength Path]

In this example, the optical network information includes transmission path information which indicates the transmission bit rate of the optical signal which is transmitted via each wavelength path. With such an arrangement, the priority level of each wavelength path is determined based upon the transmission bit rate. It should be noted that the policy for determining the priority level based upon the transmission bit rate can be specified by design parameters to be input in Step S1, for example.

In general, the quality of the optical signal is readily affected by the chromatic dispersion as the transmission bit rate is raised. Accordingly, in order to guarantee predetermined transmission quality, more strict conditions are preferably imposed to the residual chromatic dispersion for the wavelength path via which an optical signal is transmitted at a high transmission bit rate. Accordingly, in the chromatic dispersion compensation design method according to the embodiment, the wavelength path which provides a transmission bit rate exceeding a predetermined threshold bit rate is set to the "high-priority wavelength path". Furthermore, the wavelength path which provides a transmission bit rate which is equal to or smaller than the predetermined threshold bit rate is set to the "low-priority wavelength path".

Figure 11:
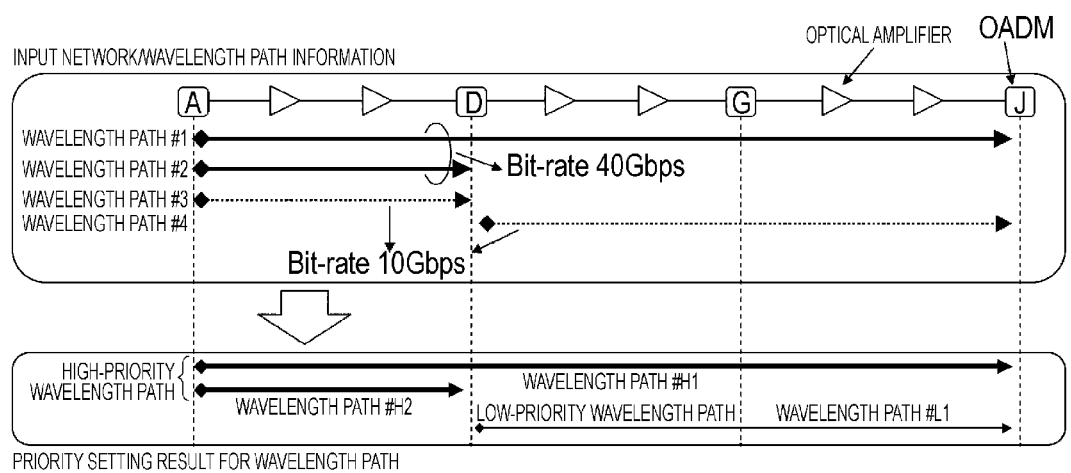
FIG. 11 illustrates another embodiment of a method for determining the priority level of each wavelength path.

Referring to FIG. 11, description will be made regarding an example. Here, the optical network includes four OADM nodes (A, D, G, J) connected to each other via optical fibers, and six optical amplifier nodes. Furthermore, a 40-Gbps wavelength path is set for each of the section A to J and the section A to D. Furthermore, a 10-Gbps wavelength path is set for each of the section A to D and the section D to J.

In this case, the section A to J has a 40-Gbps wavelength path, and accordingly, the section A to J is set to the "high-priority wavelength path". Furthermore, the section D to J has a 10-Gbps wavelength path, and accordingly, the section D to J is set to the "low-priority wavelength path". Moreover, the section A to D has a 10-Gbps wavelength path and a 40-Gbps wavelength path. With such an arrangement, in a case in which a single section has multiple wavelength paths that provide different transmission bit rates, the priority level is determined based upon the highest transmission bit rate. Accordingly, the section A to D is set to the "high-priority wavelength path".

Other Embodiments

Figure 12:
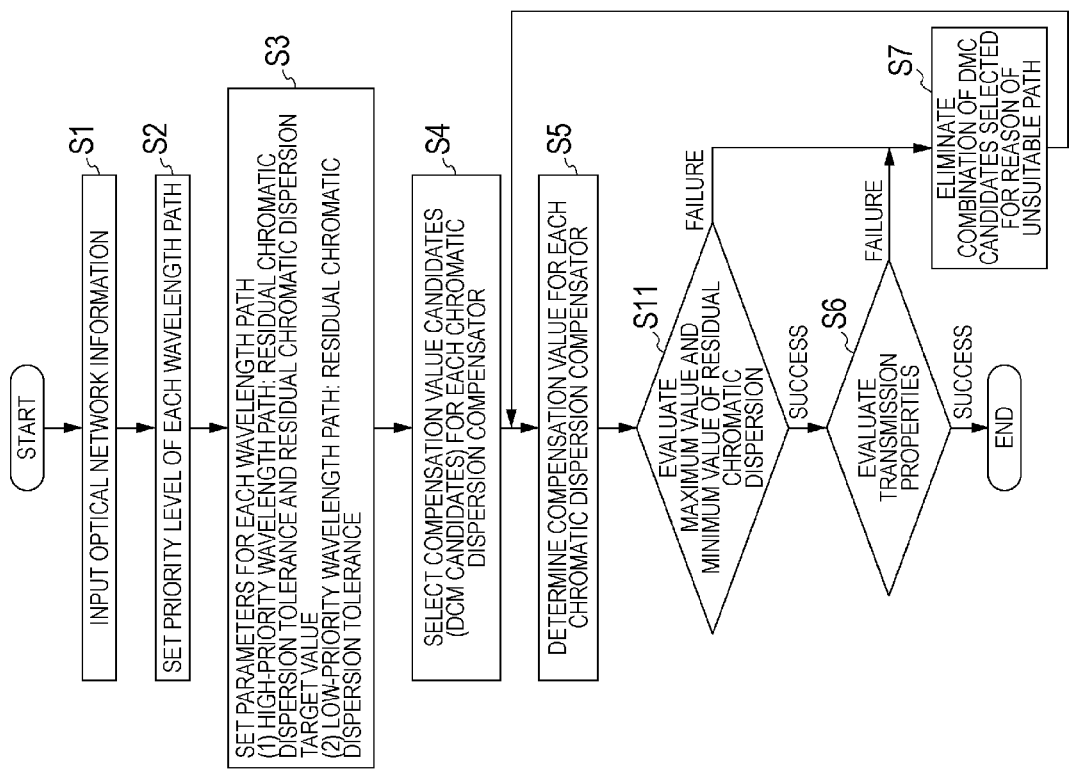
FIG. 12 is a flowchart which illustrates a chromatic dispersion compensation design method according to another embodiment.

As well known, the chromatic dispersion properties depend upon the wavelength of the signal light. Accordingly, in the WDM transmission system in which multiple optical signals are transmitted using multiple wavelengths, chromatic dispersion compensation is preferably designed giving consideration to the wavelength dependency. In order to solve such a problem, a design method according to another embodiment includes a procedure in which the wavelength at which the maximum residual chromatic dispersion occurs in the WDM wavelength band and the wavelength at which the minimum residual chromatic dispersion occurs therein are calculated, and judgment is made whether or not the residual chromatic dispersion value is within a permissible residual chromatic dispersion range for each of the two wavelength components thus calculated FIG. 12 is a flowchart which illustrates the chromatic dispersion compensation design method according to the embodiment. Steps S1 through S7 in the design method according to the present embodiment are the same as those in the above-described embodiment. That is to say, the present embodiment includes an additional step, i.e., Step S11.

Figure 13:
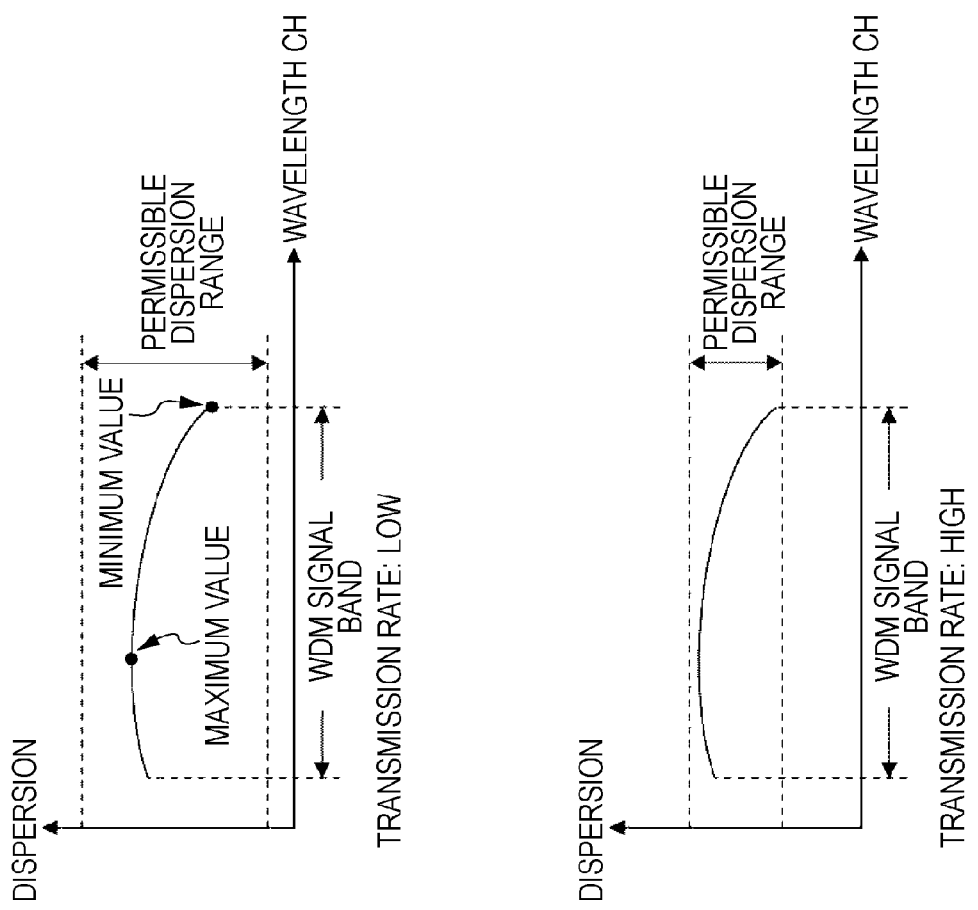
FIG. 13 is a diagram which illustrates the wavelength dependency of the compensated residual chromatic dispersion.

After the compensation value to be set for each chromatic dispersion compensator has been determined in Step S5, Step S11 is executed. After the determination of the compensation value to be set for each chromatic dispersion compensator, the compensated residual chromatic dispersion at the end terminal node in each wavelength path is calculated. With such an arrangement, the information which specifies the properties of the optical fibers used in the transmission paths are supplied. Accordingly, as illustrated in FIG. 13, the wavelength dependency of the compensated residual chromatic dispersion is obtained. Furthermore, the maximum value and the minimum value of the compensated residual chromatic dispersion are calculated in the WDM signal band.

Subsequently, judgment is made whether or not the maximum value and the minimum value of the compensated residual chromatic dispersion are within a predetermined permissible residual chromatic dispersion range. As a result, in a case in which both of the maximum value and the minimum value are within the permissible residual dispersion range, the flow proceeds to Step S6. Otherwise, the flow proceeds to Step S7. It should be noted that, as illustrated in FIG. 13, an arrangement may be made in which, in a case in which the transmission path provides a high transmission bit rate, the permissible residual chromatic dispersion range is narrowed.

Figure 14:
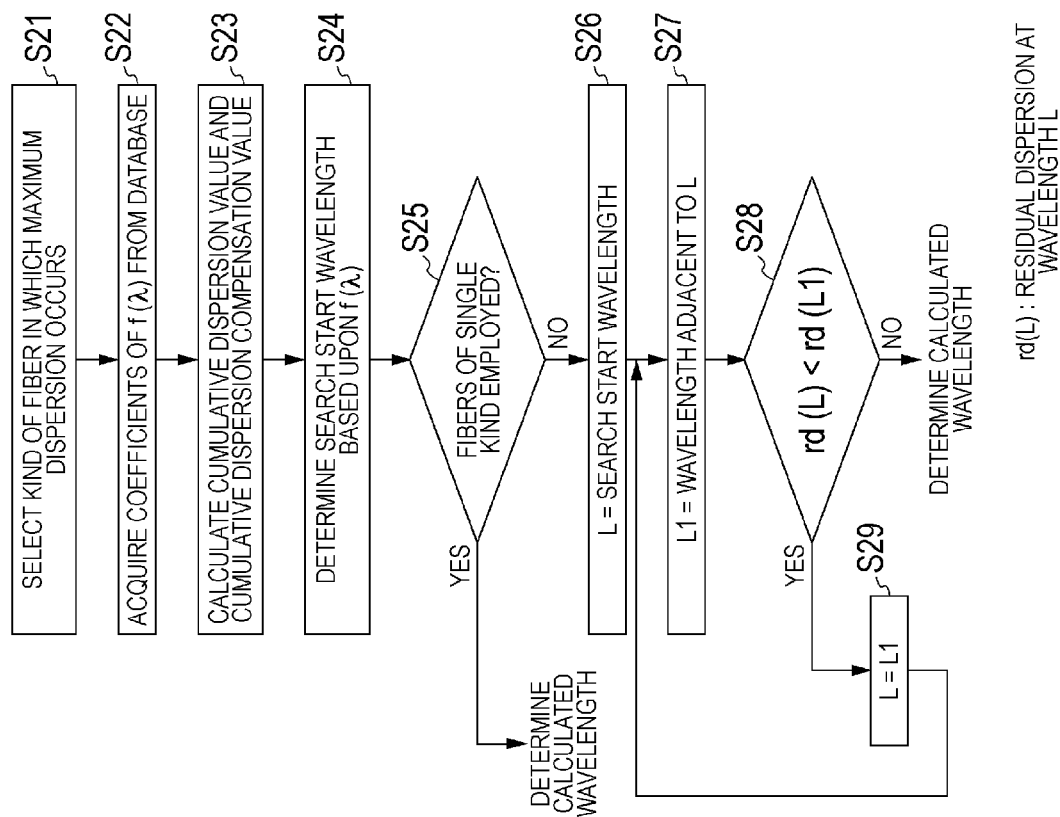
FIG. 14 is a flowchart which illustrates processing for detecting the maximum value of the compensated residual chromatic dispersion.

FIG. 14 is a flowchart which illustrates processing for detecting the maximum value of the compensated residual chromatic dispersion. Here, it is assumed that two or more kinds of optical fibers can be employed in the optical transmission path including the wavelength paths.

In Step S21, the optical fiber having the maximum chromatic dispersion is selected from among the optical fibers employed in the transmission path. In Step S22, the property function $f(\lambda)$ for the optical fiber thus selected is acquired. The property function for each optical fiber is registered beforehand in a database. With such an arrangement, the property function $f(\lambda)$ is provided in the form of a quadratic function $(a\lambda^2+b\lambda+c)$, for example, which provides dispersion per unit length.

In Step S23, cumulative chromatic dispersion is calculated based upon the length of the wavelength path. Furthermore, the total compensation value is calculated based upon the compensation values to be set for the chromatic dispersion compensators arranged on the wavelength path. In step S24, the wavelength L at which the maximum compensated residual chromatic dispersion occurs is identified based upon the cumulative chromatic dispersion and the total compensation value obtained in Step S23. In Step S25, judgment is made whether or not only the optical fibers of a single kind are employed in the wavelength path. In a case in which only the optical fiber of a single kind are employed in the wavelength path, judgment is made that the wavelength thus identified in Step S24 is the wavelength at which maximum chromatic dispersion occurs.

In a case in which two or more kinds of optical fibers are employed on the wavelength path, in Step S26, the wavelength L thus identified in Step S24 is set as a start wavelength. In Steps S27 through S29, the peak of the compensated residual chromatic dispersion rd is detected while shifting the wavelength. With such an arrangement, judgment is made that the wavelength at which a peak of the compensated residual chromatic dispersion rd occurs is the wavelength at which the maximum chromatic dispersion occurs. It should be noted that the wavelength at which the minimum value of the compensated residual chromatic dispersion occurs can be identified in a similar procedure.

As described above, the maximum value and the minimum value of the compensated residual chromatic dispersion are calculated for each wavelength path. Subsequently, judgment is made whether or not the maximum value and the minimum value thus calculated are within the permissible residual chromatic dispersion range. With such an arrangement, in a case in which the maximum value or the minimum value is not within the permissive residual chromatic dispersion range, the flow returns to Step S5 via Step S7, thereby changing the compensation values for the chromatic dispersion compensators arranged on the wavelength path. Thus, such an arrangement suitably compensates for the chromatic dispersion for all the optical signals included in the WDM signal, thereby providing sufficient transmission properties.

[Hardware Configuration]

Figure 15:
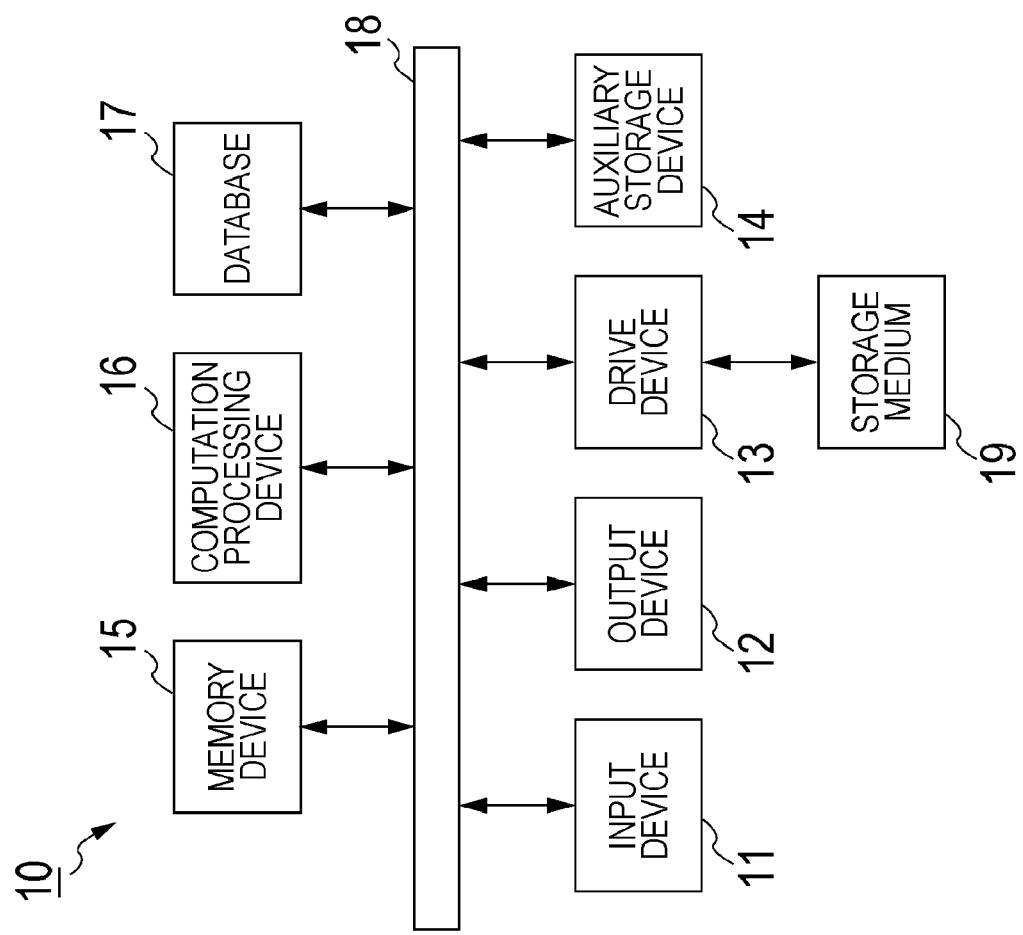
FIG. 15 is a diagram which illustrates a hardware configuration of a chromatic dispersion compensation design apparatus according to an embodiment.
Figure 16:
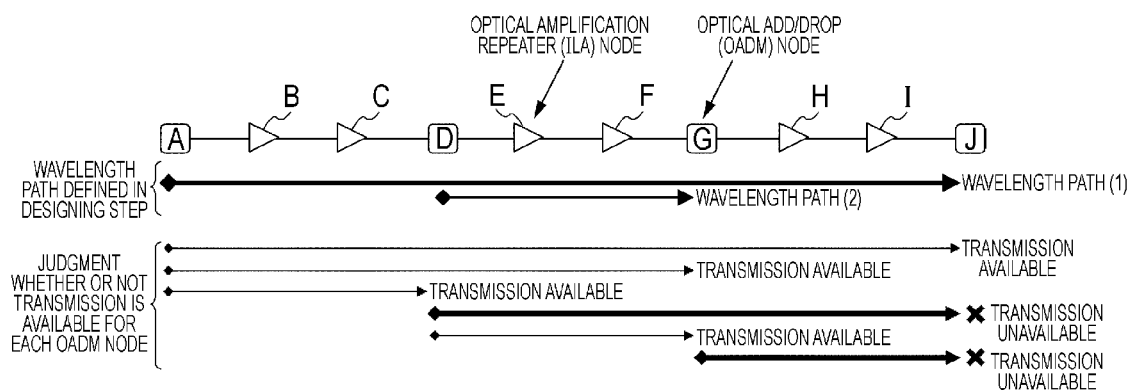
FIG. 16 is a diagram for describing a design method for chromatic dispersion compensation according to conventional techniques.

FIG. 15 is a diagram which illustrates a hardware configuration of a chromatic dispersion compensation design apparatus 10 according to an embodiment. The chromatic dispersion compensation design apparatus 10 includes an input device 11, an output device 12, a drive device 13, an auxiliary storage device 14, a memory device 15, a computation processing device 16, and a database 17, which are connected to each other via a system bus 18. The chromatic dispersion compensation design apparatus 10 may be realized by an ordinary computer or may include dedicated hardware components.

The computation processing device 16 is a CPU, for example, and executes a chromatic dispersion compensation design program using the memory device 15. The auxiliary storage device 14 is a hard disk device, for example, and stores the chromatic dispersion compensation design program. It should be noted that the auxiliary storage device 14 may be an external storage device. The memory device 15 is semiconductor memory, for example, which has a configuration including a RAM region and a ROM region. The drive device 13 accesses a storage medium 19 according to an instruction received from the computation processing device 16. The storage medium 19 is a semiconductor device (PC card or the like), a medium which allows information to be input/output using magnetic action, a medium which allows information to be input/output using optical action, or the like. The input device 11 includes a keyboard and a mouse which allows the designer to operate and to input various kinds of information. The output device 12 is a display device which provides a CUI or GUI, for example.

The chromatic dispersion compensation design program according to the embodiment includes program codes which specify the procedure illustrated in the flowcharts in FIG. 4, FIG. 12, and FIG. 15. The chromatic dispersion compensation design program is provided in the following forms, for example.

(1) The program codes are installed beforehand in the auxiliary storage device 14.

(2) The program codes are supplied via the storage medium 19.

(3) The program codes are downloaded from a program server.

By instructing a computer having the above-described configuration to execute the chromatic dispersion compensation design program, the chromatic dispersion compensation design apparatus according to the embodiment is realized.

Advantages

With such a method, the residual chromatic dispersion set for a first wavelength path having a high-priority level is controlled such that the compensation error from the target value is minimized. Furthermore, the residual chromatic dispersion set for a second wavelength path having a low-priority level is controlled such that it is within a predetermined range. With such an arrangement, the paths via which optical signals are to be transmitted in actuality are set to the first wavelength paths, and the other paths are set to the second wavelength paths. Such an arrangement allows an additional new wavelength path to be set in the future without large-scale degradation of the transmission quality of the additional new wavelength path.

What is claimed is:

1. A method for determining a value of chromatic dispersion compensation in an optical network including a plurality of nodes connected with at least one transmission line, the plurality of nodes including a plurality of dispersion compensators, the optical network including a plurality of wavelength paths between the optional nodes, the method comprising:
preparing a computer;
inputting information of an architecture of the optical network to the computer;
inputting a first priority in accordance with a first wavelength path of the optional nodes and a second priority in accordance with a second wavelength path of the optional nodes to the computer, the second priority being lower than the first priority;
setting an object value of a residual chromatic dispersion of a first end node of the first path in accordance with the information;
setting a permissible value of a residual chromatic dispersion of a second end node of the second path in accordance with the information; and
determining a compensation value of the dispersion compensators in the optical network by the computer, the compensation value selecting that an error between the object value of the residual chromatic dispersion in accordance with of the first end node of the first path and the permissible value of the residual chromatic dispersion of the first end node of the first path is least, and the value of the residual chromatic dispersion of the first end is in the permissible value of the residual chromatic dispersion of the first end node of the second path.

2. The method of claim 1, further comprising:
preparing a plurality of chromatic dispersion compensation candidacy values for each of the plurality of dispersion compensators;
setting the chromatic dispersion compensation candidacy values for each of the plurality of dispersion compensators to the computer; and
starting the determining after the setting the chromatic dispersion compensation candidacy values to the computer.

3. The method of claim 1, wherein the first priority and the second priority are provided by a user.

4. The method of claim 1, wherein the first priority and the second priority are provided in accordance with a signal speed in each of the wavelength path.

5. The method of claim 1, wherein the first priority is provided on the basis of the user or a predetermined norm; and wherein the second priority is provided on the basis of the information.

6. The method of claim 5, wherein the second wavelength path is set without the first wavelength path in the optical network.

7. The method of claim 5, wherein the second wavelength path is arranged in the first wavelength path in the optical network.

8. The method of claim 1, wherein each wavelength paths includes start node and the end node in the information, and wherein the start node and the end node include optical add-drop multiplexer.

9. The method of claim 1, wherein the determining takes into account a plurality of wavelengths in the wavelength paths and determines the compensation value of the dispersion compensators that the value of the residual chromatic dispersion is in the is in the permissible value of the residual chromatic dispersion.

10. The method of claim 1, wherein the information including an amplifier in the optical network: wherein when the dispersion compensator is arranged before an input side of the optical amplifier, the determining the compensation value of the dispersion compensators that an optical signal power outputted from the dispersion compensator is in a dynamic range of the amplifier.

11. The method of claim 1, further comprising setting an intermediate permissible value of the residual chromatic dispersion at each of the end nodes of the wavelength paths to the computer;
wherein the determining the compensation value of the dispersion compensators suits the intermediate permissible value of the residual chromatic dispersion.

12. The method of claim 1, wherein the permissible value of the residual chromatic dispersion of each of the nodes is set in accordance with a span of the transmission line between the nodes;
wherein the determining the compensation value of the dispersion compensators suits the permissible value of the residual chromatic dispersion of each of the span.

13. The method of claim 1, wherein the computer use a linear programming for the determining, the linear programming including a object function that the compensation value selecting that an error between the object value of the residual chromatic dispersion in accordance with of the first end node of the first path and the permissible value of the residual chromatic dispersion of the first end node of the first path is least, and the value of the residual chromatic dispersion of the first end is in the permissible value of the residual chromatic dispersion of the first end node of the second path.

14. The method of claim 13, further comprising:
evaluating transmission characteristics of the wavelength paths by the use of the compensation value of the dispersion compensators;
determining whether or not to satisfy the transmission characteristics of the wavelength paths;
detecting a combination of the compensation values of the dispersion compensators when at least one of the wavelength paths does not satisfy the transmission characteristics;
adding a restriction for redetermining the compensation values of the dispersion compensators by the use of the detected combination of the compensation values of the dispersion compensators so as to not select the detected combination of the compensation values of the dispersion compensators; and
calculating a new compensation values of the dispersion compensators under the restriction to satisfy the object function by the computer.

15. An apparatus for calculating value of chromatic dispersion compensation in an optical network including a plurality of nodes connected with at least one transmission line, the plurality of nodes including a plurality of dispersion compensators, the optical network including a plurality of wavelength paths between the optional nodes, the apparatus comprising:

an input part for inputting information of an architecture of the optical network to the computer;

an assign part for assigning a first priority in accordance with a first wavelength path of the optional nodes and a second priority in accordance with a second wavelength path of the optional nodes to the computer, the second priority being lower than the first priority;

a first setting part for setting an object value of a residual chromatic dispersion of a first end node of the first path in accordance with the information;

a second setting part for setting a permissible value of a residual chromatic dispersion of a second end node of the second path in accordance with the information; and a determiner for determining a compensation value of the dispersion compensators in the optical network by the computer, the compensation value selecting that an error between the object value of the residual chromatic dispersion in accordance with of the first end node of the first path and the permissible value of the residual chromatic dispersion of the first end node of the first path is least, and the value of the residual chromatic dispersion of the first end is in the permissible value of the residual chromatic dispersion of the second end node of the second path.

16. The apparatus of claim 15, further comprising a third setting part for preparing a plurality of chromatic dispersion compensation candidacy values for each of the plurality of dispersion compensators; for setting the chromatic dispersion compensation candidacy values for each of the plurality of dispersion compensators to the computer; and for starting the determining after the setting the chromatic dispersion compensation candidacy values.

* * * * *

UNITED STATES PATENT AND TRADEMARK OFFICE
CERTIFICATE OF CORRECTION

| | | |
|---|---|---|
| PATENT NO. | : 8,275,259 B2 | |
| APPLICATION NO. | : 12/578751 | |
| DATED | : September 25, 2012 | |
| INVENTOR(S) | : Toru Katagiri et al. | |

It is certified that error appears in the above-identified patent and that said Letters Patent is hereby corrected as shown below:

In the Claims:

Column 20, Line 9, In Claim 9, after "is in the" delete "is in the".

Signed and Sealed this
Eighteenth Day of December, 2012

David J. Kappos
*Director of the United States Patent and Trademark Office*